United States Patent Office 3,518,120
Patented June 30, 1970

3,518,120
STORAGE BATTERY PLATES AND METHOD OF MANUFACTURE
Giles S. Lello and Paul V. Lowe, Milwaukee, Wis., assignors to Globe Union Inc., Milwaukee, Wis., a corporation of Delaware
No Drawing. Filed Mar. 25, 1968, Ser. No. 715,590
Int. Cl. H01m 39/00
U.S. Cl. 136—26                     7 Claims

ABSTRACT OF THE DISCLOSURE

A dry activated negative plate for a dry charge battery of the lead-acid type comprising a spongy particulate lead mass, the particles of which are substantially protectively coated with a coating of a polymerized rosin containing an abietic acid dimer in an amount of at least about ten percent.

BACKGROUND OF THE INVENTION

Field of the invention

The field of this invention relates broadly to improvements in battery manufacture and more particularly to lead-acid storage batteries having a high resistance to oxidation on dry storage and to methods for achieving the same.

The dry charged lead-acid storage type battery has been in use for a considerable period of time. In conventional practice the charged cell is stored dry until ready for use, at which time the electrolyte is added. During the storage period the negative plate of the battery is in contact with the atmosphere. Oxygen from the atmosphere reacts with and oxidizes the negative plates of the battery which are essentially a pure sponge lead in particulate form. Oxidation of the sponge lead in the negative plates proceeds rapidly with a concomitant loss of charge which would otherwise be present at the time of addition of the electrolyte when the battery is placed in use. Obviously suchy oxidation and loss of charge defeats the purpose of the dry charge battery. The present invention relates to the incorporation of additives into the paste use in the manufacture of battery plates to minimize such oxidation and to methods for the manufacture of said battery.

Description of the prior art

Several expedients have been adopted in the prior art to eliminate the oxidation which occurs in dry charged cells of the lead-acid type during the dry storage period. One such procedure involves coating the particles of sponge lead which make up the negative plate with a protective film which is relatively impervious to elements of the atmosphere such as for example, oxygen, which atmospheric components contribute to the oxidation and consequent loss of charge in the battery by reacting with the sponge lead. In these prior art expedients the protective film is hopefully such that while it acts as a barrier to oxidizing and other deleterious elements of the atmosphere, it is at the same time peremable to the electrolyte when the electrolyte is added to the battery just prior to use.

Petroleum fractions, such as lubricating oil or mineral oil of certain specific characteristics have been used as protective films for these purposes as disclosed in U.S. Pat. No. 3,198,665. While achieving some improvement in oxidation resistance, the results obtained by the technique of the aforenoted patent and related prior art have not been optimum from a commercial point of view.

The use of chemical oxidation inhibitors in the negative plates has likewise been an expedient practiced in this art, but while some beneficial results have been obtained, the use of oxidation inhibitors has not generally been acceptable to the industry as a satisfactory solution to this problem.

It can be appreciated that the use of petroleum fractions and many types of organic compounds inherently create problems and difficulties by virtue of the chemical reactivity of these materials. One of the difficulties encountered in the use of some of the organic additives to battery plate pastes is that quite frequently the materials are themselves susceptible to oxidation especially in the presence of metals. Noteworthy in this respect are olefinic materials and certain sensitive aromatic compounds. It is also well known that the incorporation of oily materials, which function as a barrier coat on the lead particles in the formed battery plate, by virtue of their barrier properties interfere with the uniform flow of electrolyte in the initial charging process, thereby prolonging it. The most desirable type of additive, which additive, would be added in the paste-up stage of battery manufacture, would be one which in the initial charging process provides little if any inhibition to charging, but upon drying achieves its maximum protective capabilities for dry storage purposes and again is essentially removed and does not interfere with the operation of the battery when the electrolyte is added at the time of use.

SUMMARY OF THE INVENTION

Broadly the present invention comprises a dry activated negative plate for a dry charge battery of the lead-acid type comprising a spongy lead mass in grid plate form, the individual particles of which are protected from substantial oxidation by a coating formed thereon of a polymerized rosin containing an effective amount of an abietic acid dimer, usually in an amount of at least about ten percent of said dimer. Abietic acid is a principal constituent of rosin. Polymerized rosin, as the term is referred to herein, refers to a dimerized rosin which contains dimerized abietic acid. The commercial products available contain varying amounts of abietic acid dimer, depending upon the manufacturer. It has been found that rosin alone (principally abietic acid) is incompatible with battery paste and an unsatisfactory additive. The polymerized rosin containing abietic acid dimer, however, makes the material both compatible with the battery paste used to form the plates and also produces satisfactory results in the protection of the charged plate during dry storage. Broadly, polymerized rosins containing 10% to 100% dimer may be utilized.

Commercial products sold as polymerized rosin and containing dimerized abietic acid include Poly-Pale resin manufactured by Hercules Powder Company. This material contains about 40% dimerized abietic acid, has a softening point of about 95 to 98° C., an acid number of at least 140 to 150, a saponification number of about 160, and is soluble in a variety of organic solvents such as petroleum, ether, ethyl alcohol, toluene, kerosene, mineral spirits and liquid synthetic polymeric materials such as polymeric 1-butene. Another polymerized rosin product which is commercially available is Dimerex sold by Hercules Powder Company, which contains about 80% dimerized abietic acid.

It is contemplated that since the polymerized rosins are solids that they be added to the battery plate paste in conjunction with solvents or diluents. Quite frequently these solvents are volatile materials which disappear in the plate manufacturing and curing process and their principal function is to aid in the uniform distribution of the polymerized rosin material throughout the battery paste. The amount of polymerized rosin ranges from about .01% up to about .5%.

The present invention also broadly relates to a process for preparing a dry activated negative plate for a dry charged battery of the lead-acid type which comprises mixing lead oxide, sulfuric acid and a polymerized rosin containing an effective amount of dimerized abietic acid, said polymerized rosin being added to said paste in an amount of at least 0.01% based on lead calculated as the oxide, applying said paste to preformed battery plate grids, curing the plate by storage at ambient temperatures, electrolytically converting the pasted grid to a sponge lead negative plate, removing the plate from the electrolyte, rinsing the plate in water, and further drying and curing the plate at elevated temperatures.

The curing of the pasted plate is accomplished principally by storage of the plate at room temperature, usually in stacks. The chemical reaction results in some exothermic heat and accordingly the temperature of the plates may range from room temperature to as high as 160° F. The time of cure is approximately 48 hours. The secondary or further drying and curing of the electrolytically formed sponge lead plate is carried out at elevated temperatures, such as for example, from 220 to 240° F.

It has been found that after the initial paste-up and cure of the plate, a drop of water absorbs into the plate in from 5 to 10 minutes. After electrolytic formation and final drying and curing of the plate at elevated temperatures, a drop of water absorbs into the plate in from 4 to 8 hours. This is considered to indicate that the polymerized rosin additive is not broadly distributed as a barrier coat over the lead particles after the initial curing stage and just prior to the formation of the charged plate. The longer absorption time for the water on the cured plate, although applicants do not wish to be bound by any theory, would suggest that the additive is broadly distributed over the sponge lead particles as a protective coating which acts as a barrier to atmospheric oxygen during a dry storage period.

DESCRIPTION OF THE PREFERRED EMBODIMENTS

In the preferred form of this invention the polymerized rosin is incorporated into the battery plate in an amount of from .01% to .2%, most preferably from .02% to .1%. The proportions of abietic acid dimer present in the polymerized rosin will, in the preferred form, range from 20% to 90%, and in the most preferred form from about 40% to about 85%.

As indicated, various solvents or diluents may be added and, generally speaking, these may be used in amounts of from 0.25 to 10 parts per part of the polymerized rosin. It should be understood that the amount of carrier is not critical in this connection, since the carrier does not have any appreciable effect on the results achieved from the point of view of oxidation inhibition. As indicated in the foregoing a standard battery paste mix is prepared which contains the desired additive in a predetermined amount. The paste is pasted up on lead grids and cured at ambient temperatures for about 48 hours. Due to exothermic heat of formation, the temperature of the plate itself rises somewhat above its surroundings, up to about 160° F. After curing, the plate is electrolytically formed, using a dilute sulfuric acid, such as for example, a 3% sulfuric acid or one which has a specific gravity from 1.030 as indicated.

The following examples will illustrate the preparation of the paste and formation of the negative battery plates for dry charge storage batteries, using the principles of the present invention.

The results obtained in the tables illustrate the inhibition of lead oxide formation by the use of these materials and the percentage of charge retained on storage of the dry charged plates under accelerated aging conditions.

EXAMPLES

A basic mix of 1200 pounds of lead oxide, 19 pounds of expander (carbon black, barium sulfate and a lignin sulfonate derivative), 57 liters of water, 50 liters of sulfuric acid (specific gravity 1.325), and additive as indicated, were used in preparing the compositions for the examples. The paste was pasted on grids and cured by storage at room temperature for 48 hours. The cured plates were converted to sponge lead by typically electrolytic processing using dilute sulfuric acid (3%). The sponge lead plates were rinsed and dried in an oven at 220–240° F. The plates were then stored at 80° F. and 80% relative humidity. The lead oxide content was determined immediately after storage and after an 8 week interval.

The results are shown in the following table.

TABLE 1

| | Additive, percent | PbO increase 8 weeks storage percent |
|---|---|---|
| Example: | | |
| 1 | [1] .02 | 7.5 |
| 2 | [2] .03 | 3.5 |
| 3 | .04 | 3.5 |
| 4 | .06 | 3.0 |

[1] The polymerized rosin contained about 40% abietic acid dimer and was incorporated with 10 parts polybutene. Polybutene is a liquid polymer of 1-butene having a boiling point range of about 350 to 600° F. with from 75 to 95% boiling in the range of 350 to 540° F.

[2] In Examples 2–4 the polymerized rosin was incorporated in a solution of polybutene (.3% polybutene based on lead oxide).

The plates of Examples 1–4 were also tested for percentage of full capacity retained after 12 weeks storage under the same conditions. The following results were obtained:

TABLE 2

| Example: | Percent of full capacity retained—12 weeks |
|---|---|
| 1 | 100 |
| 2 | 100 |
| 3 | 100 |
| 4 | 100 |

Several additional examples were prepared using polymerized rosins containing varying amounts of abietic acid dimer. For example, a paste mix containing about .5 pound (.04% based on PbO) polymerized rosin having about 40% abietic acid dimer content was compared with mix containing .5 pound (0.4% based on PbO) polymerized rosin having an 80% abietic acid dimer content. In both cases a diluent was used to aid in distributing the resin (3.6 pounds of polybutene). The following results were obtained after 8 weeks storage at 80° F. and 80% relative humidity.

TABLE 3

| | Percent abietic acid dimer in additive | PbO content | |
|---|---|---|---|
| | | Initial | After 8 weeks |
| Example: | | | |
| 5 | 40 | 7 | 10 |
| 6 | 80 | 9.5 | 11 |

Tests conducted to determine shelf life showed the plates of Example 5 had a 12 month capacity of 138% of rated capacity as compared to about 152% of rated capacity at the initiation of the tests. Example 6 showed an increase in rated capacity after 6 months of from about 148 to about 155. In these tests the plates were used in a cell (150 ampere draw 80° F. and 1.270 specific gravity sulfuric acid).

The carrier used in the preceding examples was polybutene. Studies were carried out to illustrate that polybutene and other carriers have no noticeable effect in the way of protection of the plates from oxidation. Volatile carriers are essentially removed in the drying process. Several tests were made showing the results obtained using a carrier as an additive to a standard grid paste, as shown in the examples above. No polymerized rosin was added in any case.

| Carrier added | Amount added, pounds |
|---|---|
| Example: | |
| 7 _____ None (control) _____ | |
| 8 _____ Polybutene _____ | 3.6 |
| 9 _____ Mineral spirits _____ | 3.6 |
| 10 _____ Kerosene _____ | 3.6 |

The plates of Examples 7–10 were stored at 80° F. and 80% relative humidity. By 12 months the rated capacity of all of the cells made using the plates had dropped to zero. The plates of Examples 7 and 9 had dropped to zero in 8 months. All plates dropped below the established rated capacity in less than 5 months. No appreciable differences were seen in the increase in PbO content, all plates increasing from about 8 to 10, to about 24 to 27% PbO in 8 weeks.

The following examples will illustrate additional formulations containing various amounts of polymerized rosin, abietic acid dimer, and using various carriers.

| | Percent polymerized rosin | Percent abietic acid dimer in polymerized rosin | Carrier (5 to 1 ratio) |
|---|---|---|---|
| Example: | | | |
| 11 | .04 | 50 | Kerosene. |
| 12 | 0.1 | 20 | Mineral spirits. |
| 13 | .02 | 30 | Poly-1-butene. |
| 14 | .08 | 70 | Mineral spirits. |
| 15 | .10 | 10 | Kerosene. |
| 16 | .12 | 40 | Mineral spirits. |

While several particular embodiments of this invention are shown above, it will be understood, of course, that the invention is not to be limited thereto, since many modifications may be made, and it is contemplated therefore by the appended claims, to cover any such modifications as fall within the spirit and scope of this invention.

We claim:
1. A dry activated negative plate for a dry charged battery of the lead-acid type comprising a spongy lead particulate, the individual particles of which are protectively coated with a polymerized rosin containing at least about 10% by weight of abietic acid dimer, the coating being effective to inhibit oxidation from the atmosphere during storage prior to use.

2. A plate according to claim 1 wherein the polymerized rosen is present in an amount of at least about 0.01% by weight based on lead calculated as the oxide.

3. A plate according to claim 1 wherein the polymerized rosin is present as a solution in liquid polybutene resin.

4. A method of preparing a negative plate for use in a dry charge battery of the lead-acid type which comprises forming a paste of lead oxide, sulfuric acid and a polymerized rosin containing dimerized abietic acid, the polymerized rosin being incorporated in the paste in an amount of from about 0.01 to about .5% by weight of lead calculated as the oxide pasting the grid to form a negative plate, electrolytically converting the paste of the formed plate to a plate of charged sponge lead and further heating the plate of sponge lead to form a substantially uniform protective coating of polymerized rosin on the particles of sponge lead.

5. A method according to claim 4 wherein the polymerized rosin contains from about 20 to about 90% dimerized abietic acid.

6. A method according to claim 4 wherein the polymerized rosin is incorporated in an amount of from about 0.02 to about .1% by weight of lead calculated as the oxide.

7. A method according to claim 4 wherein the polymerized rosin contains from about 10 to 100% dimerized abietic acid.

References Cited

UNITED STATES PATENTS

| 1,511,461 | 10/1924 | Greenwood | 136—26.7 |
| 3,173,809 | 3/1965 | Hall | 136—26 |

FOREIGN PATENTS

| 12,824 | 6/1885 | Great Britain. |
| 515,764 | 8/1955 | Canada. |

WINSTON A. DOUGLAS, Primary Examiner

C. F. LE FEVOUR, Assistant Examiner